United States Patent
Gee

(10) Patent No.: US 6,316,541 B1
(45) Date of Patent: Nov. 13, 2001

(54) METHOD FOR MAKING POLYSILOXANE EMULSIONS

(75) Inventor: Ronald Paul Gee, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 08/270,345

(22) Filed: Jul. 5, 1994

Related U.S. Application Data

(63) Continuation of application No. 07/532,471, filed on Jun. 1, 1990, now abandoned.

(51) Int. Cl.$^7$ .............................. C08L 83/00; C08K 5/19; C08K 5/41; C08K 5/06
(52) U.S. Cl. ..................... 524/714; 524/745; 524/762; 524/837
(58) Field of Search .................. 252/312; 524/714, 524/745, 762, 837; 528/20, 21, 23, 37; 516/58, 67

(56) References Cited

U.S. PATENT DOCUMENTS

| | | | |
|---|---|---|---|
| 2,755,194 | 7/1956 | Volkmann et al. | 106/285 |
| 2,891,920 | 6/1959 | Hyde et al. | 260/29.2 |
| 3,294,725 | 12/1966 | Findlay et al. | 260/29.2 |
| 3,433,780 | 3/1969 | Cekada et al. | 260/29.2 |
| 3,975,294 | 8/1976 | Dumoulin | 252/354 |
| 4,052,331 | 10/1977 | Dumoulin | 252/312 |
| 4,146,499 | 3/1979 | Rosano | 252/186 |
| 4,472,291 | 9/1984 | Rosano | 252/186.28 |
| 4,620,878 | 11/1986 | Gee | 106/287.15 |
| 4,778,624 | 10/1988 | Ohashi et al. | 252/312 |
| 4,784,665 * | 11/1988 | Ona et al. | 252/312 |
| 4,935,464 | 6/1990 | Ona et al. | 524/837 |
| 4,999,398 * | 3/1991 | Graiver et al. | 524/837 |
| 5,064,694 * | 11/1991 | Gee | 252/312 |
| 5,302,658 * | 4/1994 | Gee et al. | 252/312 |
| 5,502,105 * | 3/1996 | Revis | 524/837 |
| 5,504,149 * | 4/1996 | Kosal | 524/837 |
| 5,817,714 * | 10/1998 | Graiver et al. | 524/762 |

FOREIGN PATENT DOCUMENTS

| | | | |
|---|---|---|---|
| 0 228 575 * | 7/1987 | (EP) . | |
| 0268982A2 | 11/1987 | (EP) | A61K/7/06 |

OTHER PUBLICATIONS

Zhang Xinghua, Yang Yajun and Liu Shufen: Studies on Emulsion Polymerization of Siloxanes, II. Mechanism of Cationic Emulsion Polymerization of Octamethylcyclotetrasiloxane. Polymer Communications, No. 4, pp. 266–270, (Aug. 1982).

Zhang Xinghua, Yang Yajun, Liu Xionguan: Effect of Temperatures on Cationic Emulsion Polymerization of Octamethylcyclotetrasiloxane Polymer Communications, No. 4, pp. 310–313, Aug. 1982.

Qiang Xihui and Xu Xuecheng: Emulsion Polymerization of $D_4$ Anion in the Presence of Nonionic Emulsifier (Zai Fei Li Zi Ru Hua Ji Cun Zai Xia $D_4$ Yin Li Zi Ru Ye Ju He De Yan Jiu) Xibei Qingongye Xueyuan Xuebao, No. 4, pp. 5–10, Dec., 1987.

* cited by examiner

Primary Examiner—Daniel S. Metzmaier
(74) Attorney, Agent, or Firm—Sharon K. Severance

(57) ABSTRACT

A method for making oil free polysiloxane standard, fine and microemulsions using emulsion polymerization is disclosed. The method comprises reacting a cyclicsiloxane in the presence of a catalyst, ionic surfactant and nonionic surfactant within a certain operating window. Emulsions containing silicone copolymers can also be produced using the method of the instant invention.

19 Claims, No Drawings

METHOD FOR MAKING POLYSILOXANE EMULSIONS

This is a continuation of application(s) Ser. No. 07/532,471 filed on Jun. 1, 1990, now abandoned.

The instant invention pertains to a method for making polysiloxane emulsions using what is commonly known as emulsion polymerization. The emulsions of this invention are produced from a mixture comprising at least one siloxane oligomer, cationic or anionic surfactant, nonionic surfactant, catalyst and water whereby the siloxane oligomer is reacted in the presence of water and the surfactants to form the polysiloxane emulsions. By using the method of the instant invention it is feasible to produce oil free standard, fine and micro-emulsions.

BACKGROUND OF THE INVENTION

Polysiloxane emulsions may be categorized by the size of the polysiloxane particles and the appearance of the emulsion. Typically three categories of silicone emulsions are recognized in the art—standard emulsions, fine emulsions and microemulsions. The term emulsion used herein encompasses the three individual types of silicone emulsions.

Silicone standard emulsions are characterized by a large particle size (typically greater than 300 nanometers) and appear to the human eye to be opaque (impenetrable to light). Silicone standard emulsions are most commonly identified as those having an intense white appearance. Silicone fine emulsions are characterized by a smaller particle size, from 300 to 140 nanometers, and are identified as those compositions which visually may be slightly opaque to very slightly translucent (transmitting light but with distortion). Silicone microemulsions are characterized as those having a particle size of less than 140 nanometers and visually appear translucent to transparent (transmitting light without distortion).

Out of the three types of silicone emulsions, fine emulsions and microemulsions are the most desired due to their smaller particle size and higher stability. Microemulsions are further desired due to their translucent to transparent appearance. Because of these factors, microemulsions are more preferred and can be used in more applications than standard or fine emulsions.

Methods for making emulsions of polysiloxanes in water are well known in the art. The methods are generally classified in two categories: mechanical means and emulsion polymerization. Mechanical means usually entail taking the polysiloxane and using mechanical means such as homogenizers or vigorous agitation to emulsify the siloxanes in water. Typically a surfactant is added to the polysiloxane or water to aid the emulsification process.

A mechanical method for making fine emulsions and microemulsions is taught in U.S. Pat. No. 4,620,878 to Gee. The method involves forming a "translucent concentrate" of surfactant, polysiloxane, and water in select proportions. The "concentrate" is then rapidly dispersed in additional water to form the fine or micro emulsion.

A mechanical method for producing standard emulsions is taught in U.S. Pat. No. 2,755,194 to Volkmann et al. The method taught by Volkmann et al. involves mixing an emulsifying agent, polysiloxane and small amount of water. The mixture is then processed by milling or mixing. This mixture is then added to additional water with appropriate mixing techniques employed to produce a stable emulsion. Alternatively all ingredients may be combined in a single step and mixed.

U.S. Pat. Nos. 3,975,294 and 4,052,331 to Dumoulin teaches emulsifying agents which may be used to create transparent microemulsions using mechanical means. These microemulsions can contain up to 15% by weight of the polysiloxane. Because the microemulsions are prepared using mechanical means only low molecular weight (less than 20,000) polysiloxanes can be emulsified.

Rosano teaches two methods for preparing microemulsions in U.S. Pat. Nos. 4,146,499 and 4,472,291. U.S. Patent No. '499 teaches a method where a surfactant and oil (polydi-organosiloxane) are combined and added to a water and surfactant solution. U.S. Patent No. '291 teaches a method for forming high viscosity microemulsions. The high viscosity microemulsions are prepared by first forming a "low viscosity" microemulsion using mechanical means and then adding an additional surfactant to that microemulsion which increases the viscosity.

Emulsion polymerization typically entails combining a reactive silicone oligomer, surfactant, polymerization catalyst and water. The mixture is stirred and the silicone oligomers are allowed to polymerize until a standard emulsion, fine emulsion or microemulsion is formed. Typically alkoxysilanes, which result in the formation of microemulsions, or cyclicsiloxanes, which result in the formation of fine and standard emulsions are used as the reactive monomers and oligomers. Combinations of the silicone reactants can also be used to form copolymers in the resulting emulsion.

Typical problems encountered with emulsion polymerization of cyclicsiloxanes include the presence of an unemulsified silicone oil layer or very large (visible to the human eye) silicone oil droplets in the final emulsion produced. Using methods known in the art, complete elimination of the silicone oil layer is not achieved unless the cyclicsiloxane is pre-emulsified using mechanical means prior to polymerization. Mechanical pre-emulsification of the cyclicsiloxanes in water prior to emulsion polymerization is a common, well known practice to those skilled in the art. Also, when using cyclicsiloxanes as the starting oligomer in methods known in the art, it is generally not possible to achieve a conversion of cyclicsiloxane into polysiloxane polymer greater than amounts determined by the ring/chain equilibrium of the system. In other words, there will always be a certain level of cyclicsiloxane present in the emulsion and this level is typically determined by the ring/chain equilibrium for the system.

There are numerous pieces of art which teach methods for using emulsion polymerization. For example U.S. Pat. No. 2,891,920 to Hyde et al. teaches an emulsion polymerization method where the polysiloxane, emulsifying agent (cationic, anionic OR nonionic surfactant), catalyst and water are all blended together (in various orders) to form an emulsion and then allowed to react at room temperature or greater. It appears that it is possible to produce only standard and possibly fine emulsions by this method.

U.S. Pat. No. 3,294,725 to Findlay et al. teaches an emulsion polymerization method wherein a mechanically produced pre-emulsion is made of the siloxane in the presence of the catalyst. Heat is then applied to this emulsion and the siloxanes reacts to form the polysiloxane emulsion. Various sulfonic acids and their salts are taught as the catalysts for the polymerization. The catalysts also act as the emulsifying agent thereby eliminated the need for additional materials. The examples provided in the Findlay patent show that when cyclicsiloxanes are employed as the starting material, less than 90% of the starting cyclicsiloxanes are consumed after several days of reacting. The resulting emulsions contain a broad distribution of particle sizes of polysiloxanes and may contain a layer of unemulsified silicone oil if the polysiloxane is not pre-emulsified. It appears that only standard and fine emulsions can be produced by this method.

A method for preparing colloidal suspensions of only silsesquioxanes is taught in U.S. Pat. No. 3,433,780 to Cekada et al. These colloidal suspension have an extremely small particle size (10 nanometers to 100 nanometers) and in most cases contain less than 25% by weight of the silsesquioxane. The method comprises combining the water and catalyst, heating the water solution (optional) and rapidly or slowly adding a trialkoxysilane to the water solution. When rapid addition is employed the suspension can contain up to 10% by weight of the silsesquioxane. Silsesquioxane are materials which contain 3 Si—O bonds per molecule.

Several papers have been published in China on studies of silicone emulsion polymerization using cationic surfactants and in some experiments, additionally using nonionic surfactants. A paper published by Northwestern University of Light Industry, China, Xibei Qingongye Xueyuan Xuebao, No. 4, pp. 5–10, December 1987, discusses the improved stability of emulsion produced using a nonionic surfactant and an anionic surfactant. However, the method employed in the paper does not result in an "oil free" emulsion with the least amount of unemulsified oil cited as being 0.9%. Nor does the paper teach a method which allows for controlling the particle size.

Additionally, two papers, Institute of Chemistry, Academia Sinica, Beijing, China, Polymer Communications, No. Aug. 4, 1982, pp. 266–270 and pp. 310–313, report on the mechanism of cationic emulsion polymerization and the effect of temperature on cationic emulsion polymerization, respectively. The emulsions taught in these papers do not contain nonionic surfactants and again do not teach a method which allows for specific control of the particle size.

The methods known in the art using emulsion polymerization are limited as the resulting emulsions do not have a broad range of possible particle sizes. Further, the methods have narrow or no range in which they will produce oil-free (those containing no unemulsified silicone oil) emulsions unless pre-emulsification is employed.

It is an object of this invention to provide a method for making polysiloxane emulsions using emulsion polymerization.

It is further an object of this invention to provide a method for controlling the emulsion polymerization to produce a desired type of emulsion having a desired particle size and which is free of unemulsified silicone oil.

It is further an object of this invention to provide a method for producing stable, oil-free microemulsions without having to mechanically pre-emulsify the polysiloxane.

It is further an object of this invention to provide a single method which allows for the production of emulsions, fine emulsions and microemulsions.

THE INVENTION

It has been found that by controlling or specifying certain operating parameters in the method of the instant invention for the preparation of polysiloxane emulsions via emulsion polymerization, the type and particle size of emulsion resulting from the method can be controlled. It has also been found that by including a nonionic surfactant during the polymerization reaction that a stable, oil-free emulsion will result. The method of the instant invention can be used to produce standard emulsions, fine emulsions and microemulsions. Emulsions with particle sizes greater than approximately 10 nanometers (nm) can be produced using the method of the instant invention. The operating parameters which have been shown to have specific importance in controlling the particle size include reaction temperature, amount and type of ionic (anionic or cationic) surfactant, amount and type of nonionic surfactant, amount of water, amount of catalyst and the optional presence of alcohols.

The method of the instant invention has been shown to produce stable, oil free (containing no unemulsified silicone oil) emulsions when the above identified reaction parameters are within certain limits. A stable, oil-free emulsion is one that is defined as an emulsion which does not contain any unemulsified silicone material and does not produce unemulsified silicone oil or polymers upon aging.

Further, the method of the instant invention has been found to be capable of producing emulsions which contain higher amounts of polysiloxane polymer than typically determined by the ring/chain equilibrium of the system. Conversion of cyclicsiloxane to polysiloxane can range from values determined by the ring/chain equilibrium of the system to 100 percent. Essentially all of the cyclicsiloxane is considered reacted when, at a minimum, values determined by the ring/chain equilibrium for the system are achieved.

The emulsions produced by the method of this invention are comprised of at least one silicone material, cationic or anionic (herein referred to as only ionic) surfactant, nonionic surfactant, catalyst and water. In some instances it is possible to have an ionic surfactant that can also act as the catalyst thereby giving an emulsion comprised of silicone, ionic surfactant, nonionic surfactant, and water. In other instances it is possible to have an ionic surfactant that has nonionic characteristics such that it behaves as a ionic and nonionic surfactant thereby giving an emulsion comprised of a silicone, ionic surfactant, catalyst and water.

The polymerization reaction employed in the method of this invention involves the opening of cyclicsiloxane rings using an acid or base catalyst in the presence of water. Upon opening of the rings, polysiloxanes oligomers with terminal hydroxy groups are formed. These polysiloxane oligomers then react with each other or with other siloxane reactants that may be in the reaction medium, through a condensation reaction to form the polysiloxane polymers or copolymers. It is believed that these polymers precipitate and aggregate to form particles which are stabilized at a specific particle size in the water by the ionic and nonionic surfactants. The particle size is determined by the reaction parameters and the components used in forming the emulsions.

Polydiorganocyclicsiloxanes which are useful in the method of this invention are those that are generally insoluble in water and can be readily polymerized using emulsion polymerization techniques. The preferred cyclicsiloxanes are of the general formula

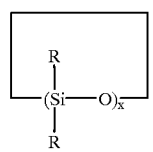

wherein each R is independently selected from a saturated or unsaturated alkyl group consisting of 1 to 6 carbon atoms, an aryl group consisting of 6 to 10 carbon atoms, wherein any of said R groups optionally contain a functional group which is unreactive in the ring opening and polymerization reaction; and x has a value of 3 to 7.

R may be further defined as methyl, ethyl, propyl, phenyl, allyl, vinyl, —$R^1$—F, where $R^1$ is selected from an alkylene group containing 1 to 6 carbon atom and an arylene group containing 6 to 10 carbon atoms; and F is a functional group such as an amine, diamine, halogen, carboxy, mercapto and others; and —$R^1$—$F^1$—R wherein $R^1$ and R are as described above and $F^1$ is a non carbon atom such as oxygen, nitrogen, sulfur and others.

The cyclicsiloxanes useful in the instant invention may be exemplified by compounds such as hexamethylcyclotrisiloxane, octamethylcyclotetrasiloxane, decamethylcyclopentasiloxane, tetramethyltetravinylcyclotetrasiloxane, tetramethyltetraphenylcyclotetrasiloxane, and others. Mixtures of the various cyclicsiloxanes may also be used for the preparation of the emulsions.

It is feasible to produced copolymers through the emulsion polymerization reaction by having present in the reaction medium a small portion of other siloxane reactants. These siloxane reactants may be any compound that contains a hydrolyzable or silanol group and that is capable of polymerization using emulsion polymerization. It is preferred that these siloxane reactants comprise no more than 10 mole percent of the total silicone content.

Examples of the siloxane reactants include organofunctional siloxanes such as amine functional silanes, vinyl functional silanes, halogenalkyl functional silanes, and hydroxy endblocked polysiloxanes. These siloxane reactants can be further exemplified by silanol terminated polydimethysiloxanes with a degree of polymerization between 1 and 7, N-(2-aminoethyl)-3-aminopropyltrimethoxysilane, trimethoxyvinylsilane, tris-(2-methoxyethoxy)vinylsilane, and 3-chloropropryltrimethoxysilane.

The emulsions produced by the method of this invention typically contain a silicone concentration of 10 to 70 percent by weight of the total emulsion solution. The preferred level of silicone is 25 to 60 percent by weight of the total emulsion solution. The larger the particle size, the higher the concentration of polysiloxane the emulsion may contain. Emulsions may be produced which contain less than 10 percent silicone content however, these emulsions typically hold little or no economic value.

The reaction to polymerize the silicones and form the emulsions is carried out in a reaction medium comprised of water, at least one ionic surfactant, at least one nonionic surfactant, and a catalyst. Any catalyst that is capable of polymerizing cyclicsiloxanes in the presence of water is useful in the method of the instant invention. Catalysts for the reaction include those catalysts which are known as condensation polymerization catalysts and are capable of cleaving siloxane bonds. Condensation polymerization catalysts known in the art include, but are not limited to, strong acids such as substituted benzenesulfonic acids, aliphatic sulfonic acids, hydrochloric acid, and sulfuric acid, and strong bases such as quaternary ammonium hydroxides and metal hydroxides. In some instances, ionic surfactants, such as dodecylbenzenesulfonic acid, can additionally function as the catalyst. Other useful catalytic systems include phase transfer catalysts such as tetrabutyl ammonium hydroxide or ion exchange resins whereby a catalyst may be formed in situ.

The catalyst is present in the reaction medium usually at levels of 0.01 to 30 percent by weight of the total silicone. Typically the strong acids and basic metal hydroxides can be used within the lower end of this range while the ionic surfactants which also functions as the catalyst will be present at the concentration on the higher end of this range.

The reaction medium must further comprise both an ionic AND a nonionic surfactant to stabilize the polysiloxane in the emulsion. Ionic surfactants may be selected from either a cationic or an anionic surfactant known in the art as useful in emulsion polymerization.

Suitable anionic surfactants include, but are not limited to, sulfonic acids and their salt derivatives. The anionic surfactants useful in the instant invention can be exemplified by, but are not limited to alkali metal sulforicinates; sulfonated glyceryl esters of fatty acids such as sulfonated monoglycerides of coconut oil acids; salts of sulfonated monovalent alcohol esters such as sodium oleylisethionate; amides of amino sulfonic acids such as the sodium salt of oleyl methyl tauride; sulfonated products of fatty acids nitriles such as palmitonitrile sulfonate; sulfonated aromatic hydrocarbons such as sodium alphanaphthalene monosulfonate; condensation products of naphthalene sulfonic acids with formaldehyde; sodium octahydroanthracene sulfonate; alkali metal alkyl sulfates, ether sulfates having alkyl groups of 8 or more carbon atoms, and alkylarylsulfonates having 1 or more alkyl groups of 8 or more carbon atoms.

Anionic surfactants commercially available and useful in the instant invention include, but are not limited to, dodecylbenzenesulfonic acid sold under the name BIOSOFT S-100 by STEPAN CO. and related salts such as the sodium salt of dodecylbenzensulfonic acid sold under the name SIPONATE DS-10 by ALCOLAC INC.

Cationic surfactants useful in the method of the instant invention are those known in the art to be useful in stabilization of emulsions produced via emulsion polymerization. These cationic surfactants include, but are not limited to, various fatty acid amines and amides and their derivatives, and the salts of the fatty acid amines and amides. The cationic surfactants useful in the instant invention can be exemplified by, but are not limited to, aliphatic fatty amines and their derivatives such as dodecylamine acetate, octadecylamine acetate and acetates of the amines of tallow fatty acids; homologues of aromatic amines having fatty chains such as dodecylanalin; fatty amides derived from aliphatic diamines such as undecylimidazoline; fatty amides derived from disubstituted amines such as oleylaminodiethyl-amine; derivatives of ethylene diamine; quaternary ammonium compounds such as tallow trimethyl ammonium chloride, dioctadecyldimethyl ammonium chloride, didodecyldimethyl ammonium chloride and dihexadecyldimethyl ammonium chloride; amide derivatives of amino alcohols such as beta-hydroxyethylsterarylamide; amine salts of long chain fatty acids; quaternary ammonium bases derived from fatty amides of di-substituted diamines such as oleylbenzylamino-ethylene diethylamine hydrochloride; quaternary ammonium bases of the benzimidazolines such as methylheptadecyl benzimidazol hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloro-methyl ether; urethanes of ethylene diamine such as the condensation products of stearic acid and diethylene triamine; polyethylene diamines; and polypropanolpolyethanol amines.

Cationic surfactants commercially available and useful in the instant invention include, but are not limited to ARQUAD T27W, ARQUAD 16–29, ARQUAD C-33, ARQUAD T50, ETHOQUAD T/13 ACETATE, all manufactured by AKZO CHEMIE.

The ionic surfactant is typically present at levels of 0.05 to 30 percent by weight of the total emulsion. The preferred levels are from 0.5 to 20 percent by weight of the total emulsion.

Nonionic surfactants useful in the method of the instant invention are those that have a hydrophilic-lipophilic balance (HLB) between 10 and 20. Nonionic surfactants with an HLB of less than 10 may be used in the instant invention, however, a hazy solution may result due to the limited solubility of the nonionic surfactant in water. It is preferred that when using a nonionic surfactant with an HLB of less than 10, that a nonionic surfactant with an HLB of greater than 10 also be added during or after polymerization. The preferred nonionic surfactants are those which are stable in the polymerization environment.

The nonionic surfactants useful in method of the instant invention can be exemplified by, but not limited to, 2,6,8trimethyl-4-nonyloxypolyethylene oxyethanol (6EO) (sold as TERGITOL TMN-6 by UNION CARBIDE CORP.);

2,6,8-trimethyl-4-nonyloxypolyethylene oxyethanol (10EO) (sold as TERGITOL TMN-10 by UNION CARBIDE CORP.);

alkyleneoxypolyethyleneoxyethanol (C 11–15, secondary alkyl, 7EO) (sold as TERGITOL 15-S-7 by UNION CARBIDE CORP.);

alkyleneoxypolyethyleneoxyethanol (C 11–15, secondary alkyl, 9EO) (sold as TERGITOL 15-S-9 by UNION CARBIDE CORP.);

alkyleneoxypolyethyleneoxyethanol (C 11–15, secondary alkyl, 15EO) (sold as TERGITOL 15-S-15 by UNION CARBIDE CORP.);

octylphenoxy polyethoxy ethanol (40EO) (sold as TRITON X405 by ROHM and HAAS CO.), and nonylphenoxy polyethoxy ethanol (10EO) (sold as MAKON 10 by STEPAN CO.).

Levels of nonionic surfactant typically greater than 0 and less than 40 weight percent based on the weight of the total emulsion are useful in obtaining oil-free emulsions using the method of the instant invention. The preferable levels are from 0.5 to 30 weight percent based on the total weight of the emulsion.

Presently there are some commercially available ionic surfactants that have the characteristics of both the ionic and nonionic surfactants combined in the same compound. One such compound is sold by AKZO CHEMIE under the name of ETHOQUAD 18/25 (methylpolyoxyethylene (15) octadecylammonium chloride). This compound is a cationic quaternary ammonium salt with polyethyleneoxide tails. When this type of ionic surfactant is used in the method of the instant invention it is not necessary to have both the ionic and nonionic surfactant present in the reaction medium. Only the ionic surfactant having the nonionic characteristics is needed in the reaction medium. However, if the ionic surfactant does not have the characteristics of both the ionic and nonionic surfactants it is necessary to use both types of surfactants in the method of the instant invention. These types of surfactants are typically used in the emulsion at levels equal to the level of ionic surfactants used.

The method of this invention is preferably carried out by creating a mixture comprising a cyclicsiloxane, ionic surfactant, nonionic surfactant, water and catalyst. The mixture is then heated with agitation at a polymerization reaction temperature until essentially all of the cyclicsiloxane is reacted and a stable, oil-free emulsion is formed. The time required for formation of the stable, oil-free emulsion will vary depending on the reactants and the reaction conditions.

The mixture of cyclicsiloxane, ionic surfactant, nonionic surfactant, water and catalyst is not stable and will separate without some means of agitation. It is not necessary to have all of the cyclicsiloxane fully dispersed into the mixture during the reaction however, some means of agitation must be provided throughout the course of the reaction.

Combining the cyclicsiloxane, ionic surfactant, nonionic surfactant, water and catalyst and then reacting the cyclicsiloxanes to form the emulsion can take place in several ways. The first of these ways is to combine all of the ingredients with agitation, in any given order, and heat to the desired polymerization temperature with agitation thereby allowing the cyclicsiloxanes to react and form an emulsion. Another way is to combine all of the ingredients with agitation, except for the catalyst, heat to the desired polymerization temperature, add the catalyst and thereafter heat and agitate at the desired polymerization temperature thereby allowing the cyclicsiloxanes to react and form an emulsion. Another way is to combine all of the ingredients with agitation, except for the cyclicsiloxane, heat to the desired polymerization temperature, add or feed in the cyclicsiloxane and thereafter heat and agitate at the desired polymerization temperature thereby allowing the cyclicsiloxanes to react and form an emulsion.

It is not essential that the ingredients used in producing the emulsions by the method of this invention be combined in any given order. However, it is essential to have agitation during and following the addition of the ingredients and to have achieved or to heat to the polymerization temperature when all of the ingredients have been combined.

The preferred method for forming the emulsions is to create a mixture by combining the cyclicsiloxane or mixture of cyclicsiloxanes, at least one nonionic surfactant, at least one ionic surfactant and water; providing agitation such that the cyclicsiloxane is fully dispersed in the mixture; heating to the polymerization temperature; and adding the catalyst. The mixture is then held at the polymerization temperature with agitation until a stable, oil-free emulsion is formed.

The method of this invention may also be carried out by combining and mechanically emulsifying at least the siloxane reactant, nonionic surfactant and part of the water. Additional water, the ionic surfactant, catalyst and nonionic surfactant can be added to the pre-emulsion with agitation. The mixture is then heated to the polymerization reaction temperature and held optionally with agitation until the monomer is consumed in forming the emulsion. Because of the formation and stability of the pre-emulsion it is not necessary to have agitation during the course of the polymerization reaction.

Polymerization reaction temperatures useful in the method of the instant invention are typically above the freezing point but below the boiling point of water. Pressures above or below atmospheric pressure may allow operation outside of this range. At lower temperatures, especially those below room temperature, the polymerization reaction may proceed more slowly. The preferred temperature range is to have a temperature of at least 50° C. but less than 95° C.

The polymerization reaction can be stopped at the desired level of conversion of cyclicsiloxane and/or particle size by using methods known in the art. It is preferred to stop the reaction when the largest amount of cyclicsiloxane has been reacted or when ring/chain equilibrium for the system and the desired particle size have been obtained. Reaction times of less than 24 hours, and typically less than 5 hours, are sufficient to achieve the desired particle size and/or level of conversion. The methods for stopping the reaction typically encompass neutralization of the catalyst by the addition of equal or slightly greater stoichiometric amount of acid or base (depending upon the type of catalyst). Either a strong or weak acid/base may be used to neutralize the reaction. Care must be taken when using a strong acid/base not to over neutralize as it may be possible to re-catalyze the reaction. It is preferred to neutralize with sufficient quantities of acid or base such that the resulting emulsion has a pH of less than 7 when a cationic surfactant is present and a pH of greater than 7 when a anionic surfactant is present.

By controlling certain operational parameters of the method of this invention it is possible to produce an emulsion of a specific type (standard, fine or micro) and further, to produce a desired particle size in the resulting emulsion. These operational parameters include reaction temperature, amount and type of ionic surfactant, amount and type of nonionic surfactant, amount of water, amount of catalyst and the optional presence of alcohols. The trends experienced when altering some of these parameters are not what would be typically expected by those skilled in the art.

It has been found when using the method of the instant invention, that increasing the reaction temperature increases the particle size of the polysiloxane. By holding the concentrations and types of reactants constant, it is feasible to produce different emulsions each with different particle sizes by altering the reaction temperature used in the production of each emulsion. For optimum particle size control it is preferred to add the catalyst into the mixture comprising the ionic surfactant, nonionic surfactant, cyclicsiloxane, and water after heating the mixture to the polymerization temperature.

It has also been found when using the method of the instant invention, that increasing the amount of the ionic surfactant decreases the particle size of the polysiloxane. The ionic surfactant present during the polymerization reaction appears to have the greatest effect on the particle size. Additional ionic surfactant added in the latter part of the polymerization reaction, just prior to or after neutralization, does not appear to greatly affect the particle size. Additional ionic surfactant is optionally added in the latter part of the polymerization reaction as a means for minimizing viscosity. It is possible to have equivalent amounts of ionic surfactant present in the final emulsion yet produce different particle sizes. This can be achieved by adding different amounts of ionic surfactant during the polymerization reaction and adding any additional amounts in the latter part of the polymerization reaction or just prior to neutralization. High levels of the ionic surfactant present during the polymerization reaction will often result in incomplete reactions and the failure to produce an oil-free emulsion. Levels of ionic surfactant which are too small may also cause similar effects. Those skilled in the art will be able to readily determine the levels of ionic surfactant needed to produce the desired emulsion.

The type of ionic surfactant used in forming the emulsion can also effect the particle size of the polysiloxane. Ionic surfactants can be classified by their hydrophilicity (HLB) or by the number of carbons in the alkyl group of the surfactant. By choosing an ionic surfactant with a higher degree of hydrophilicity and holding all other operational parameters constant, a larger particle size will result in the emulsion formed. A higher degree of hydrophilicity is often associated with shorter alkyl chains. An ionic surfactant with a lower degree of hydrophilicity will result in an emulsion with a smaller particle size. It is preferred to use ionic surfactants having an alkyl chain containing 8 or more carbon atoms.

The amount of nonionic surfactant can also be used to control the particle size in the emulsion. By increasing the amount of nonionic surfactant, the particle size is increased. It is preferred that most of the nonionic surfactant be present in the reaction medium during the polymerization reaction to have an effect on the particle size. It is necessary to have the nonionic surfactant present during the polymerization reaction to result in an oil-free emulsion.

The nonionic surfactants can be classified by the HLB factor. Nonionic surfactants may be further classified by their hydrocarbon segment. Using a nonionic surfactant having the same or almost the same type of hydrocarbon segment and having a larger HLB value will generally result in a smaller particle size. The structure of the hydrocarbon segment (ie. linear, branched, aryl and combinations thereof) of the nonionic surfactant will also have some effect on the particle size of the emulsion formed.

The amount of water present during the polymerization of the siloxanes has also been found to effect the type of emulsion formed. Typically higher quantities of water present during the reaction will result in a smaller particle size. Although it typically takes more water to produce emulsions with smaller particle sizes it is still feasible to produce micro or fine emulsions having relatively high polysiloxane concentrations. Fine and microemulsions produced by the method of the instant invention can contain 30% to 60% by weight of polysiloxane.

The amount of catalyst present during the polymerization reaction can result in varying particle sizes. It has been found that increasing the catalyst concentration can increase the particle size of the emulsion formed. The degree of effect that the catalyst concentration has on the particle size is dependent upon the type of ionic and nonionic surfactants used. With some surfactant systems there may be an upper limit to the amount of catalyst that will result in an increased particle size. Above that limit, any additional catalyst added will not further increase the particle size.

A small quantity of alcohol can be added into the reaction medium before or after catalysis to increase the particle size of the emulsion. Alcohols useful in the method of the instant invention include methanol, ethanol and isopropanol. It is well known in the art that alcohols are typically used to break emulsions. Because of this it is preferred to keep the concentration of the alcohol at low levels, more preferably below 5 percent by weight. To have the greatest effect on the particle size it is preferred to have the alcohol present throughout the course of the polymerization reaction.

By operating within the window outlined by the above mentioned parameters it is feasible to produce a stable emulsion free of oil. Since each operational parameter has an interactive effect relative to all other operational parameters it is not possible to give the exact limits for each. By interactive effect, it is meant that the value of one parameter is dependent upon the values of the other parameters. One skilled in the art would be able to readily determine the limits on the operational parameters for the type of emulsion being produced based on the type and amounts of reactants and the reaction conditions. It is possible in the method of the instant invention to simultaneously change two operational parameters and negate the effect of each resulting in no change of particle size or type of emulsion formed.

It has also been found that using the method of this invention within the operating window outlined above and that by neutralizing the catalyst and thereby stopping the polymerization reaction at a certain point, cyclicsiloxane conversions of up to 100 percent can be achieved. By allowing the reaction to continue beyond this point, cyclicsiloxane will reform at levels approaching the values determined by the ring/chain equilibrium for the system. Thus, the method of this invention can allow for cyclicsiloxane conversions greater than those determined by ring/chain equilibrium for the system. The reasons as to why higher level of cyclicsiloxane conversion occurs is not quite understood however, an understanding is not necessary to practice the method of the instant invention. One skilled in the art will be able to determine the point at which to stop the reaction to achieve the higher levels of cyclicsiloxane conversion using techniques known in the art which allow one to follow the polymerization reaction.

So that those skilled in the art can understand and appreciate the invention taught herein, the following examples are presented, being it understood that these examples should not be used to limit the scope of this invention over the limitations found in the claims attached hereto.

In the following examples particle size was determined using a particle size instrument using the principle of quasi-elastic light scattering and the cumulant method of D. E. Koppel {(J. Of Chem Phys., 57, 4814(1972)}. Percent Conversion was determined using a weight loss method consisting of placing 2 grams of material in a oven at 105° C. for 2 hours. The calculation for determining percent conversion was the difference between the percent nonvolatile content and the percent non-silicone nonvolatile divided by the percent silicone all times 100.

Examples 1 through 10 illustrate the use of cationic and nonionic surfactants in the emulsion polymerization reaction of cyclicsiloxanes and the effects of the various operating parameters. Examples 11 illustrates the co-polymerization of a cyclicsiloxane and a reactive silane using cationic and nonionic surfactants. Example 12 illustrates the use of a cationic surfactant that has the characteristics of both a cationic and a nonionic surfactant. Example 13 illustrates the process where a cationic/nonionic surfactant system is used and where the silicone is pre-emulsified prior to catalysis. Example 14 illustrates the use of an anionic surfactant that has the characteristics of both a anionic surfactant and a catalyst. Example 15 illustrates the effect of the amount of nonionic surfactant in the emulsion polymerization reaction of cyclicsiloxanes using an anionic surfactant-catalyst. Example 16 illustrates the use of functionalized cyclicsiloxanes in the process. Example 17 illustrates the process whereby a standard emulsion is produced. Example 18 illustrates the effect of agitation on the ability to produce the emulsions.

Comparative Example 1

This example illustrates the method as taught in U.S. Pat. No. 3,294,725, example 1.

A solution of 150 grams of dimethylcyclicsiloxane, 5 grams of the sodium salt of dodecylbenzenesulfonic acid, 2 grams of dodecylbenzenesulfonic acid and 333 grams of water were placed in a reactor, agitated vigorously by stirring and heated to 80° C. The reaction medium was held at 80° C. for 24 hours with continued stirring.

A sample was taken after 3 hours and neutralized The result was a white emulsion having a particle size of 80 nanometers (nm) with a broad size distribution. After the sample was allowed to stand for several hours there was observed to be 22% unemulsified oil on the top which indicated that only a small portion of the cyclicsiloxane had reacted.

After 24 hours the product was neutralized. It was an opaque white emulsion having a particle size of 130 nm with a broad particle size distribution. After standing for several hours there was observed to be 6% unemulsified oil on the top. Percent conversion of the reacted cyclicsiloxane was determined to be 87%.

Comparative Example 2

This example illustrates a method wherein only a cationic surfactant is used and the nonionic surfactant is not used.

450 grams of water, 184 grams of ARQUAD T27W and 350 grams of cyclicsiloxanes having an average of 4 Si atoms per molecule, were added with stirring to a reaction flask and heated to 75° C. 10 grams of 20% by weight sodium hydroxide was added to the mixture in the flask. The reaction was allowed to proceed for 3.5 hours before being neutralized with 5.8 grams of 85 percent concentrated phosphoric acid. The resulting product contained about 11% oil on top. The particle size was 136 nm, however, there was a large particle size distribution. The conversion of monomer was 79% by weight.

The same emulsion was produced according to the method of this invention by additionally using 95 grams of MAKON 10 (see example 1). This emulsion was oil free and had a particle size of 35 nm and a conversion of monomer of 95%.

Comparative Example 3

This example further shows the elimination of the nonionic surfactant.

600 grams of water, 35 grams of ARQUAD T27W and 350 grams of cyclicsiloxanes having an average of 4 Si atoms per molecule, were added with stirring to a reaction flask and heated to 95° C. 10 grams of 20% by weight sodium hydroxide was added to the mixture in the flask. The reaction was allowed to proceed for 3.5 hours before being neutralized with 5.8 grams of 85 percent concentrated phosphoric acid. The resulting product contained about 13% oil on top. The particle size was 153 nm. The conversion of monomer was 81% by weight.

The same emulsion was produced according to the method of this invention by additionally using 30 grams of MAKON 10. The emulsion was oil free, had a particle size of 118 nm and the conversion of monomer was 84% by weight.

Comparative Example 4

This example illustrates a method wherein only an anionic surfactant is used and the nonionic surfactant is not used.

350 grams of water, and 200 grams of cyclicsiloxanes having an average of 4 Si atoms per molecule, were added with stirring to a reaction flask and heated to 95° C. 50 grams of dodecylbenzenesulfonic acid was added to the mixture in the flask. The reaction was allowed to proceed for 17 minutes before it became too viscous to stir. The particle size was 53 nm however, there was a large particle size distribution. The conversion of monomer was not determined. The same emulsion was produced according to the method of this invention by additionally using 20 grams of TRITON X405. The mixture did not become too viscous and was allowed to react for 4 hours. The emulsion was oil free, had a particle size of 82 nm and the conversion of monomer was 93%.

EXAMPLE 1

This example illustrates a typical procedure of this invention wherein all of the surfactant is added at the beginning of the experiment.

354.9 grams of water, 95 grams of MAKON 10, 184 grams of ARQUAD T27W and 350 grams of cyclicsiloxanes having an average of 4 Si atoms per molecule, were added with stirring to a reaction flask and heated to 75° C. 10 grams of 20% by weight sodium hydroxide was added to the mixture in the flask. The reaction was allowed to proceed for 2.5 hours with stirring before being neutralized with 5.8 grams of 85 percent concentrated phosphoric acid. The resulting product was an oil free, microemulsion with a 38 nanometer (nm) particle size. The conversion of monomer was 95% by weight. After 16 months at room temperature the microemulsion was still oil-free and had a particle size of 40 nm.

EXAMPLE 2

This example illustrates a typical method of this invention wherein all of the nonionic and part of the cationic surfactant is added at the beginning of the reaction and another part is added after catalysis.

354.9 grams of water, 95 grams of MAKON 10, and 350 grams of cyclicsiloxanes having an average of 4 Si atoms per molecule, were added to a reaction flask with stirring and heated to 65° C. 150 grams of ARQUAD T27W and 10 grams of 20% by weight sodium hydroxide was added to the mixture in the flask. After the reaction had proceeded for 45 minutes an additional 34 grams of ARQUAD T27W was added to minimize the viscosity. The reaction was stopped after 2 hours and 45 minutes by neutralization with 5.8 grams of 85 percent concentrated phosphoric acid. An oil-free microemulsion with a particle size of 31 nm was formed. Percent conversion of monomer was not determined. After 17 months at room temperature the microemulsion was oil free and had a particle size of 30 nm.

EXAMPLE 3

This example illustrates the effect of the reaction temperature on the particle size.

The reaction was carried out by combining, with stirring, in a reaction flask 355 grams of water, 95 grams of MAKON 10, 140 grams of ARQUAD T27W and 350 grams cyclicsiloxanes having an average of 4 Si atoms per molecule. The contents in the flask were heated to the desired temperature (Table 1). 10 grams of 20% by weight sodium hydroxide was added to the mixture in the flask. The reaction was allowed to proceed until the monomer was consumed or the system was in equilibrium. The catalyst was neutralized by the addition of 5.8 grams of 85 percent concentrated phosphoric acid. In runs 3 and 4 an additional 44 grams of ARQUAD T27W was added in the latter part of the reaction to minimize viscosity. In run 5 only 34 grams of the ARQUAD T27W was added. Particle size and conversion results are given in Table 1. The microemulsions were all oil-free. After 16 months at room temperature, the microemulsions were oil-free and had a particle size of 36 nm (Run 3), 48 nm (Run 4) and 51 nm (Run 5).

TABLE 1

| Run No. | 3 | 4 | 5 |
| --- | --- | --- | --- |
| Temperature (° C.) | 65 | 70 | 75 |
| Particle Size (nm) | 34 | 45 | 50 |
| Percent Conversion | 85 | 98 | 100 |
| Reaction Time (hrs.) | 5 | 4 | 5 |

EXAMPLE 4

This example illustrates the effect of concentration of cationic surfactant on the particle size of the emulsion formed. The procedure used is the same as used in example 3. All reactions were run at 65° C. In Run 6 an additional 34 grams of ARQUAD T27W was added 1.5 hours after catalysis to minimize viscosity. In Run 7 an additional 34 grams of ARQUAD T27W was added 45 minutes after catalysis to minimize the viscosity. In Run 8, no additional ARQUAD T27W was added after catalysis. Operating Parameters and results are given in Table 2. The microemulsions were all oil free. After 16 months at room temperature, the microemulsions were oil-free and had a particle size of 32 nm (Run 6), 30 nm (Run 7) and 28 nm (Run 8).

TABLE 2

| Run No. | 6 | 7 | 8 |
| --- | --- | --- | --- |
| ARQUAD T27W (g) | 140 | 150 | 184 |
| MAKON 10 (g) | 95 | 95 | 95 |
| Cyclicsiloxane (g) | 350 | 350 | 350 |
| Water (g) | 355 | 355 | 355 |
| 20% NaOH (g) | 10 | 10 | 10 |
| Particle Size (nm) | 34 | 31 | 27 |
| Percent Conversion | 100 | nd | nd |
| Reaction Time | 6 | 4 | 2 | nd = not determined

EXAMPLE 5

This example illustrates the effect of concentration of the nonionic surfactant on the particle size of the emulsion formed. The procedure used is the same as used in example 3. Two different types of nonionic surfactants were evaluated at different concentrations (MAKON 10 and TERGITOL 15S7). No. additional cationic surfactant was added during the course of the polymerization. In runs 12 and 13, 95 and 44 grams of water, respectively, was added after neutralization. In runs 9–11, the amount of water used is adjusted to compensate for the additional MAKON 10 being added. Operating Parameters and results are given in Table 3. The microemulsions and the fine emulsion contained no free oil. After 1 year at room temperature, the microemulsions and the fine emulsion contained no free oil and had a particle size of 27 nm (Run 9), 32 nm (Run 10), 41 nm (Run 11) and 165 nm (Run 13).

TABLE 3

| Run No. | 9 | 10 | 11 | 12 | 13 |
| --- | --- | --- | --- | --- | --- |
| ARQUAD T27W | 210 | 210 | 210 | 140 | 140 |
| MAKON 10 (g) | 75 | 85 | 95 | — | — |
| TERGITOL 15S7 (g) | — | — | — | 60 | 95 |
| Cyclicsiloxane (g) | 350 | 350 | 350 | 350 | 350 |
| Water (g) | 349 | 339 | 329 | 355 | 355 |
| 20% NaOH (g) | 10 | 10 | 10 | 10 | 10 |
| Temperature | 75 | 75 | 75 | 65 | 65 |
| Particle Size (nm) | 26 | 32 | 39 | 63 | 158 |
| Percent Conversion | 85 | 84 | 95 | 99 | 95 |
| Reaction Time | 2.5 | 2.5 | 4 | 4 | 2.5 |

EXAMPLE 6

This example illustrates the effect of concentration of water on the particle size of the emulsion formed. The procedure used is the same as used in example 3. Two different reaction temperatures (95° C. and 70° C.) were evaluated at varying water concentrations. Operating Parameters and results are given in Table 4. The oil formed in runs 15 to 16 illustrate examples where the water concentration is, respectively, at the edge of and outside the operating window of the invention. Runs 14, 17 and 18 are inside the operating window producing emulsions with no free oil. The fine emulsion produced in run 14 had no free oil after 6 months at room temperature. The microemulsion produced in run 17 had no free oil after 16 months at room temperature and had a particle size of 33 nm. The microemulsion produced in run 18 had no free oil after 1 year at room temperature. No further oil developed in the fine and microemulsions produced in runs 15 and 16.

TABLE 4

| Run No. | 14 | 15 | 16 | 17 | 18 |
| --- | --- | --- | --- | --- | --- |
| ARQUAD T27W | 17 | 17 | 17 | 184 | 184 |
| MAKON 10 (g) | 17 | 17 | 17 | 95 | 95 |
| Cyclicsiloxane (g) | 350 | 350 | 350 | 350 | 350 |
| Water (g) | 180 | 250 | 290 | 355 | 522 |
| 20% NaOH (g) | 10 | 10 | 10 | 10 | 10 |
| Temperature | 95 | 95 | 95 | 70 | 70 |
| Particle Size (nm) | 241 | 162 | 131 | 33 | 25 |
| Percent Oil | 0 | trace | 3 | 0 | 0 |
| Percent Conversion | nd | 84 | 86 | 97 | 88 |
| Reaction Time | 2 | 3 | 3 | 6 | 6 | nd = not determined

EXAMPLE 7

This example illustrates the effect of HLB of the nonionic surfactant on the particle size of the emulsion formed. The procedure used is the same as used in example 3. All reactions were run at 65° C. During Runs 20–22 an additional 44 grams of ARQUAD T27W was added in the latter part of the polymerization to minimize viscosity. Operating Parameters and results are given in Table 5. Comparing runs 20 and 22 shows the effect of different hydrocarbon groups on surfactants with similar HLB's. The fine and microemulsions contained no free oil. The fine emulsion produced in run 19 had no free oil after 15 months at room temperature and had a particle size of 165 nm. After 10 months at room temperature, the microemulsion produced in run 20 was oil-free and had a particle size of 69. The microemulsions produced in runs 21 and 22 were oil-free after 16 months at room temperature and had a particle size of 37 nm and 32 nm, respectively.

TABLE 5

| Run No. | 19 | 20 | 21 | 22 |
| --- | --- | --- | --- | --- |
| ARQUAD T27W (g) | 140 | 140 | 140 | 140 |
| Nonionic Surf. (g) | 95 | 95 | 95 | 95 |
| Type Nonionic* | T15S7 | T15S9 | T15S12 | MAKON10 |
| HLB | 12.2 | 13.3 | 14.5 | 13 |
| Cloud Point | 37 | 60 | 90 | 54 |
| Cyclicsiloxane (g) | 350 | 350 | 350 | 350 |
| Water (g) | 355 | 355 | 355 | 355 |
| 20% NaOH (g) | 10 | 10 | 10 | 10 |
| Temperature | 65 | 65 | 65 | 65 |
| Particle Size (nm) | 158 | 64 | 34 | 34 |
| Percent Conversion | 95 | 96 | nd | 85 |
| Reaction Time | 2.5 | 6 | 2.5 | 5 |

*T=TERGITOL
nd = not determined

EXAMPLE 8

This example illustrates the effect of the type of cationic surfactant on the particle size of the emulsion formed. The procedure used is the same as used in example 3. All reactions were run at 70° C. No additional cationic surfactant was added in the latter part of the polymerization. All emulsions were prepared using 50 grams of actual cationic surfactant (they are available in varying concentrations). The amount of water added was adjusted according to the amount of water in the surfactant such that all emulsion were prepared using a total of 489 grams of water. Operating Parameters and results are given in Table 6. Run 26 is considered to have failed since the cyclicsiloxane conversion did not achieve at least ring/chain equilibrium, however, there was no unemulsified oil. The low conversion of cyclicsiloxanes is believed to have been caused by the type of cationic surfactant in which the alkyl group was too short. The microemulsions produced in runs 23–25 were all oil free. After 15 months at room temperature, the microemulsions produced in runs 23 and 24 were oil free and had a particle size of 33 and 38 nm, respectively. After 1 year at room temperature, the microemulsion produced in run 25 contained no free oil. After 11 months, the standard emulsion produced in run 26 was oil free and had a particle size of 1158 nm.

TABLE 6

| Run No. | 23 | 24 | 25 | 26 |
| --- | --- | --- | --- | --- |
| Cationic Surf. (g) (diluted in water) | 184 | 172 | 152 | 62.5 |
| Type Cationic* | A-T27W | A16-29 | A-C33 | A-L8-80MS |
| Alkyl Group | C17 | C16 | C12 | C8 |
| MAKON 10 | 95 | 95 | 95 | 95 |
| Cyclicsiloxane (g) | 350 | 350 | 350 | 350 |
| Water (g) | 355 | 367 | 387 | 476.4 |
| 20% NaOH (g) | 10 | 10 | 10 | 10 |
| Temperature | 70 | 70 | 70 | 70 |
| Particle Size (nm) | 33 | 35 | 92 | 1206 |
| Percent Conversion | 97 | 93 | 96 | 19 |
| Reaction Time | 6 | 2.5 | 4 | |

*A = ARQUAD

EXAMPLE 9

This example illustrates the effect of the addition of alcohols into the reaction medium on the particle size of the emulsion formed. The procedure used is the same as used in example 3. All reactions were run at 70° C. No additional cationic surfactant was added in the latter part of the reaction. Operating Parameters and results are given in Table 7. The 36 grams of isopropanol reported in Run 28 was present in the cationic surfactant (ARQUAD T50) and was not an additional amount added into the reaction medium. The fine and microemulsions contained no free oil. After 15 months at room temperature the micro and fine emulsions produced in runs 27 and 28 contained no free oil and had a particle size of 33 nm and 298 nm, respectively. After 11 months at room temperature the microemulsion run 29 was oil-free.

TABLE 7

| Run No. | 27 | 28 | 29 |
| --- | --- | --- | --- |
| Cationic Surf. (g) | 184 | 100 | 184 |
| Type Cationic* | T27W | T50 | T27W |
| MAKON 10 | 95 | 95 | 95 |
| Cyclicsiloxane (g) | 350 | 350 | 350 |
| Water (g) | 355 | 439 | 350 |
| 20% NaOH (g) | 10 | 10 | 10 |
| Temperature | 70 | 70 | 70 |
| Isopropanol | 0 | 36 | 5 |
| Particle Size (nm) | 33 | 290 | 45 |
| Percent Conversion | 97 | 88 | 98 |
| Reaction Time | 6 | 5.5 | 4 |

*All are ARQUAD

EXAMPLE 10

This example illustrates the effect of the catalyst concentration on the particle size of the emulsion formed. The procedure used is the same as used in example 3. No additional cationic surfactant was added in the latter part of the reaction. Operating Parameters and results are given in Table 8. Runs 30 and 31 used ETHOQUAD T/13 ACETATE and TERGITOL 15S12 as the cationic and nonionic surfactants. Runs 32–34 used ARQUAD T27W and MAKON 10 as the cationic and nonionic surfactants. The microemulsions contained no free oil. After 2 months at room temperature, the microemulsions produced in runs 30 and 31 were oil-free. After 1 months at room temperature, the microemulsions produced in runs 32 to 34 were oil-free.

TABLE 8

| Run No. | 30 | 31 | 32 | 33 | 34 |
|---|---|---|---|---|---|
| Cationic Surf. (g) | 103 | 103 | 184 | 184 | 184 |
| Type Cationic* | T/13 | T/13 | T27W | T27W | T27W |
| TERGITOL 15S12 | 47 | 47 | 0 | 0 | 0 |
| MAKON 10 | 0 | 0 | 95 | 95 | 95 |
| Cyclicsiloxane (g) | 300 | 300 | 350 | 350 | 350 |
| Water (g) | 350 | 350 | 362 | 361 | 360 |
| 50% NaOH (g) | 2.1 | 1.5 | 3 | 4 | 5 |
| Temperature | 95 | 95 | 70 | 70 | 70 |
| Particle Size (mn) | 80 | 70 | 38 | 42 | 43 |
| Percent Conversion | 90 | 89 | 89 | 87 | 86 |
| Reaction Time | 4 | 4 | 4 | 4 | 4 |

*T/13 = ETHOQUAD T/13 ACETATE
T27W = ARQUAD T27W

EXAMPLE 11

This example shows the use of cyclicsiloxanes and a aminofunctional silane such that there is copolymerization of the two silanes.

The reaction was carried out using the same method as in example 3. No additional cationic surfactant was added in the latter part of the polymerization. In run 35 the aminofunctional silane was added 1 hour after catalysis. In run 36 the aminofunctional silane was added before catalysis. Reaction Conditions and Results are given in Table 9. N-(2-aminoethyl)-3-aminopropyltrimethoxysilane was used in runs 35 and 36.

It is believed that the larger particle size in run 36 resulted from the formation of alcohol during the hydrolysis of the aminofunctional siloxane. If the aminofunctional silane is added after catalysis and the reaction of cyclics is underway the alcohol formed does not appear to effect the particle size (see run 27 for comparison). The microemulsions contained no free oil. After 13 months at room temperature, the microemulsion produced in run 35 was oil free. After 15 months at room temperature, the microemulsion produced in run 36 was oil free and had a particle size of 48 nm.

TABLE 9

| Run No. | 35 | 36 |
|---|---|---|
| ARQUAD T27W (g) | 184 | 184 |
| MAKON 10 | 95 | 95 |
| Cyclic Siloxane (g) | 346 | 346 |
| Aminofnct. Silane (g) | 6.5 | 6.5 |
| Water (g) | 355 | 352 |
| 20% NaOH (g) | 10 | 10 |
| Temperature | 70 | 70 |
| Particle Size (nm) | 33 | 46 |
| Percent Conversion | 96 | 78 |
| Reaction Time | 4 | 3 |

EXAMPLE 12

This example shows the use of a cationic surfactant that has the characteristics of both a cationic and a nonionic surfactant in the same compound.

483.9 grams of water, 150 grams of ETHOQUAD 18/25 (cationic/nonionic surfactant), and 350 grams of cyclicsiloxanes with an average of 4 Si atoms per molecule, were combined, with stirring, in a reaction flask and heated to 70° C. 10 grams of 20% sodium hydroxide was added to the mixture in the flask with agitation. The reaction was allowed to proceed for 3.5 hours before neutralizing the catalyst with 5.8 grams of 85 percent concentrated phosphoric acid. An oil-free microemulsion having a particle size of 51 nm resulted. An 85% conversion of monomer was achieved. After 15 months at room temperature, the microemulsion was oil-free.

EXAMPLE 13

This example illustrates the process where the silicone is pre-emulsified prior to catalysis.

60 grams of TERGITOL 15S9 was dissolved in 340 grams of water while stirring. 600 grams of cyclicsiloxanes were added and mixed for another 15 minutes. This mixture was passed through a sonolator once at 1300 psi to produce and emulsion having 346 nm particle size.

416.7 grams of the emulsion produced above was placed in a flask. While stirring, 307.5 grams water, 220 grams ARQUAD T27W and 40 grams TERGITOL 15S9 and 10 grams of 20% sodium hydroxide were added to the emulsion. This was immediately heated to 75° C. and held for 5 hours. The catalyst was neutralized with 5.8 grams of 85% concentrated phosphoric acid. The resulting microemulsion had a particle size of 53 nanometers and contained no free oil. After 18 months at room temperature, the microemulsion contained no free oil and had a particle size of 51 nm.

EXAMPLE 14

This example shows the use of an anionic surfactant that has the characteristics of both an anionic surfactant and a catalyst in the same compound.

615.7 grams of water, 80 grams of TRITON X405 and 200 grams of cyclicsiloxanes with an average of 4 Si atoms per molecule, were combined, with stirring, in a reaction flask and heated to 70° C. 50 grams of dodecylbezenesulfonic acid (DBSA) was added to the mixture in the flask with agitation. The reaction was allowed to proceed for 19 hours before neutralizing the catalyst with 54 grams of triethanolamine. An oil-free microemulsion having a particle size of 79 nm resulted. A 93% conversion of monomer was achieved. After 15 months at room temperature, the microemulsion contained no free oil and had a particle size of 73 nm.

EXAMPLE 15

This example illustrates the use of an anionic surfactant and the effects of varying the amount of nonionic surfactant. The procedure is the same as in example 14. Results are given in Table 10. The fine and microemulsions contained no free oil. After 4 months at room temperature, the fine and microemulsions produced in runs 40 to 42 were oil-free. After 3 months at room temperature, the microemulsion produced in run 43 was oil-free.

TABLE 10

| Run No. | 40 | 41 | 42 | 43 |
|---|---|---|---|---|
| TRITON X405 | 80 | 40 | 20 | 10 |
| Cyclic Siloxane (g) | 200 | 200 | 200 | 200 |
| Water (g) | 350 | 350 | 350 | 350 |
| DBSA (g) | 50 | 50 | 50 | 50 |
| Temperature | 95 | 95 | 95 | 95 |

TABLE 10-continued

| Run No. | 40 | 41 | 42 | 43 |
|---|---|---|---|---|
| Particle Size (nm) | 173 | 124 | 82 | 52 |
| Percent Conversion | 95 | 96 | 93 | nd |
| Reaction Time | 4 | 4 | 4 | 2 | nd = not determined

EXAMPLE 16

This example illustrates the use of a functionalized cyclicsiloxane in the process. The cyclicsiloxane contains methyl and vinyl functionality.

315.6 grams of water, 56 grams of MAKON 10, 112 grams of ARQUAD T27W and 210 grams of cyclicsiloxanes having an average of 4 Si atoms per molecule and containing at least one vinyl group per Si atom, were added with stirring to a reaction flask and heated to 70° C. 2.10 grams of 50% by weight sodium hydroxide was added to the mixture in the flask. The reaction was allowed to proceed for 4 hours before being neutralized with 4.1 grams of 85 percent concentrated phosphoric acid. The resulting product was an oil free microemulsion with a 50 nm particle size. The conversion of monomer was 84% by weight. After 1 month at room temperature, the microemulsion was oil-free.

EXAMPLE 17

This example illustrates using the process to produce a standard emulsion.

1336 grams of water, 14 grams of MAKON 10, 14 grams of ARQUAD T27W and 245 grams of cyclicsiloxanes having an average of 4 Si atoms per molecule, were added with stirring to a reaction flask and heated to 95° C. 2.8 grams of 50% by weight sodium hydroxide was added to the mixture in the flask. The reaction was allowed to proceed for 2 hours before being neutralized with 2.17 grams of glacial acetic acid. The resulting product was an oil free standard emulsion with a 401 nm particle size. The conversion of monomer was 86% by weight. After 1 month at room temperature, the emulsion was free of oil.

EXAMPLE 18

This example illustrates the effects of agitation on the process for making the emulsions.

248.4 grams of water, 66.5 grams of MAKON 10, 128.8 grams of ARQUAD T27W and 245 grams of cyclicsiloxanes having an average of 4 Si atoms per molecule, were added with stirring to a reaction flask and heated to 70° C. 2.8 grams of 50% by weight sodium hydroxide was added to the mixture in the flask. The contents were mixed at an agitator speed of 100 RPM. After ½ hour there was a small layer (approximately ¼ inch) of cyclicsiloxanes on the top of the reaction mixture. This layer slowly decreased in size with time until it disappeared. The reaction medium was neutralized after 20 hours with 4.1 grams of 85% concentrated phosphoric acid. An additional 103 grams of water was added to dilute emulsion to the desired solids level. The resulting product was an oil free microemulsion with a 42 nm particle size. After three days at room temperature there was no free oil present.

The same emulsion as above was prepared at an agitator speed of 300 RPM. There was no undispersed oil in the reaction medium throughout the course of the reaction. The resulting product was an oil free microemulsion with a 34 nm particle size. After three days at room temperature there was no free oil present.

What is claimed is:

1. A method for producing stable, oil free polysiloxane emulsions comprising the steps of:
    (I) preparing a mixture (I) by mixing
        (a) a cyclicsiloxane, or a mixture of cyclicsiloxanes,
        (b) a nonionic surfactant, or a mixture of nonionic surfactants,
        (c) an ionic surfactant, or a mixture of ionic surfactants, and
        (d) water
    (II) adding to the mixture (I) with stirring and heating,
        (e) a condensation polymerization catalyst; and
    (III) agitating the mixture (I) and catalyst at a polymerization reaction temperature until essentially all cyclicsiloxane is reacted, whereby a stable, oil-free emulsion is formed; and wherein said cyclicsiloxane or mixture of cyclicsiloxanes have not been mechanically pre-emulsified prior to the addition into the mixture (I) and prior to catalyzing.

2. A method as claimed in claim 1 wherein additionally the mixture (I) is heated to the polymerization reaction temperature prior to the addition of the catalyst into the mixture (I).

3. A method as claimed in claim 1 wherein the mixture (I) additionally contains siloxane reactants wherein said siloxane reactants contain a hydrolyzable or silanol group and is capable of polymerization using emulsion polymerization.

4. A method as claimed in claim 1 wherein the cyclicsiloxane or mixture of cyclicsiloxanes are:

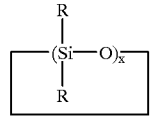

wherein each R is independently a saturated or unsaturated alkyl group consisting of 1 to 6 carbon atoms or an aryl group consisting of 6 to 10 carbon atoms, wherein any of said R groups optionally contain a functional group which is unreactive in the ring opening and polymerization reaction; and x has a value of 3 to 7.

5. A method as claimed in claim 4 wherein the cyclicsiloxane is octamethylcyclosiloxane.

6. A method as claimed in claim 1 wherein the ionic surfactant is selected from the group consisting of cationic and anionic surfactants.

7. A method as claimed in claim 1 wherein the ionic surfactant is structurally such that it also functions as the nonionic surfactant.

8. A method for controlling emulsion polymerization to produce an emulsion having a desired particle size and which is free of unemulsified silicone oil wherein the method comprises
    (I) mixing, in sufficient quantities to produce a mixture (I) having the desired particle size,
        (a) a cyclicsiloxane, or a mixture of cyclicsiloxanes,
        (b) a nonionic surfactant, or a mixture of nonionic surfactants,
        (c) an ionic surfactant, or a mixture of ionic surfactants,
        (d) water,
    (II) adding to the mixture (I) with stirring and heating,
        (e) a condensation polymerization catalyst; and
    (III) agitating the mixture (I) and catalyst at a polymerization reaction temperature until essentially all cyclicsiloxane is reacted, whereby a stable, oil-free emulsion is formed; and wherein said cyclicsiloxane or mixture of cyclicsiloxanes have not been mechanically pre-emulsified prior to the addition into the mixture (I) and prior to catalyzing.

9. The method as claimed in claim 8 wherein the control is provided by varying at least one operational parameter selected from the group consisting of reaction temperature, amount of ionic surfactant, type of ionic surfactant, amount of nonionic surfactant, type of nonionic surfactant, amount of water, amount of catalyst, and optional presence of an alcohol.

10. The method as claimed in claim 8 wherein a higher temperature results in a larger particle size.

11. The method as claimed in claim 9 wherein increasing the amount of ionic surfactant results in a smaller particle size.

12. The method as claimed in claim 9 wherein by employing an ionic surfactant having a higher hydrophilic-lipophilic balance results in larger particle size.

13. The method as claimed in claim 9 wherein increasing the amount of nonionic surfactant results in a larger particle size.

14. The method as claimed in claim 9 wherein increasing the amount of water results in a smaller particle size.

15. The method as claimed in claim 9 wherein increasing the amount of catalyst results in a larger particle size.

16. The method as claimed in claim 8 wherein the ionic surfactant is selected from the group consisting of cationic and anionic surfactants.

17. A method for producing stable, oil free polysiloxane emulsions comprising the steps of:
(I) preparing a mixture (I) by mixing
   (a) a cyclicsiloxane, or a mixture of cyclicsiloxanes,
   (b) a nonionic surfactant, or a mixture of nonionic surfactants, and
   (c) water
(II) adding to the mixture (I) with stirring and heating,
   (d) an ionic surfactant, or mixture of ionic surfactants wherein the ionic surfactant also functions as a condensation polymerization catalyst; and
(III) agitating the mixture (I) and catalyst at a polymerization reaction temperature until essentially all cyclicsiloxane is reacted, whereby a stable, oil-free emulsion is formed; and wherein said cyclicsiloxane or mixture of cyclicsiloxanes have not been mechanically pre-emulsified prior to the addition into the mixture (I) and prior to catalyzing.

18. A method for producing stable, oil free polysiloxane emulsions comprising the steps of:
(I) preparing a mixture (I) by mixing
   (a) a condensation polymerization catalyst
   (b) a nonionic surfactant, or a mixture of nonionic surfactants,
   (c) an ionic surfactant, or a mixture of ionic surfactants, and
   (d) water
(II) adding to the mixture (I) with stirring and heating,
   (e) a cyclicsiloxane, or a mixture of cyclicsiloxanes; and
(III) agitating the mixture (I) and cyclicsiloxane at a polymerization reaction temperature until essentially all cyclicsiloxane is reacted, whereby a stable, oil-free emulsion is formed; and wherein said cyclicsiloxane or mixture of cyclicsiloxanes have not been mechanically pre-emulsified prior to the addition into the mixture (I) and prior to catalyzing.

19. A method for controlling emulsion polymerization to produce an emulsion having a desired particle size and which is free of unemulsified silicone oil wherein the method comprises:
(I) mixing, in sufficient quantities to produce a mixture (I) having the desired particle size,
   (a) a condensation polymerization catalyst,
   (b) a nonionic surfactant, or a mixture of nonionic surfactants,
   (c) an ionic surfactant, or a mixture of ionic surfactants, and
   (d) water
(II) adding to the mixture (I) with stirring and heating,
   (e) a cyclicsiloxane, or a mixture of cyclicsiloxanes; and
(III) agitating the mixture (I) and cyclicsiloxane at a polymerization reaction temperature until essentially all cyclicsiloxane is reacted, whereby a stable, oil-free emulsion is formed; and wherein said cyclicsiloxane or mixture of cyclicsiloxanes have not been mechanically pre-emulsified prior to the addition into the mixture (I) and prior to catalyzing.

* * * * *